(No Model.)
F. J. SPRAGUE.
GEARING.
No. 387,745. Patented Aug. 14, 1888.
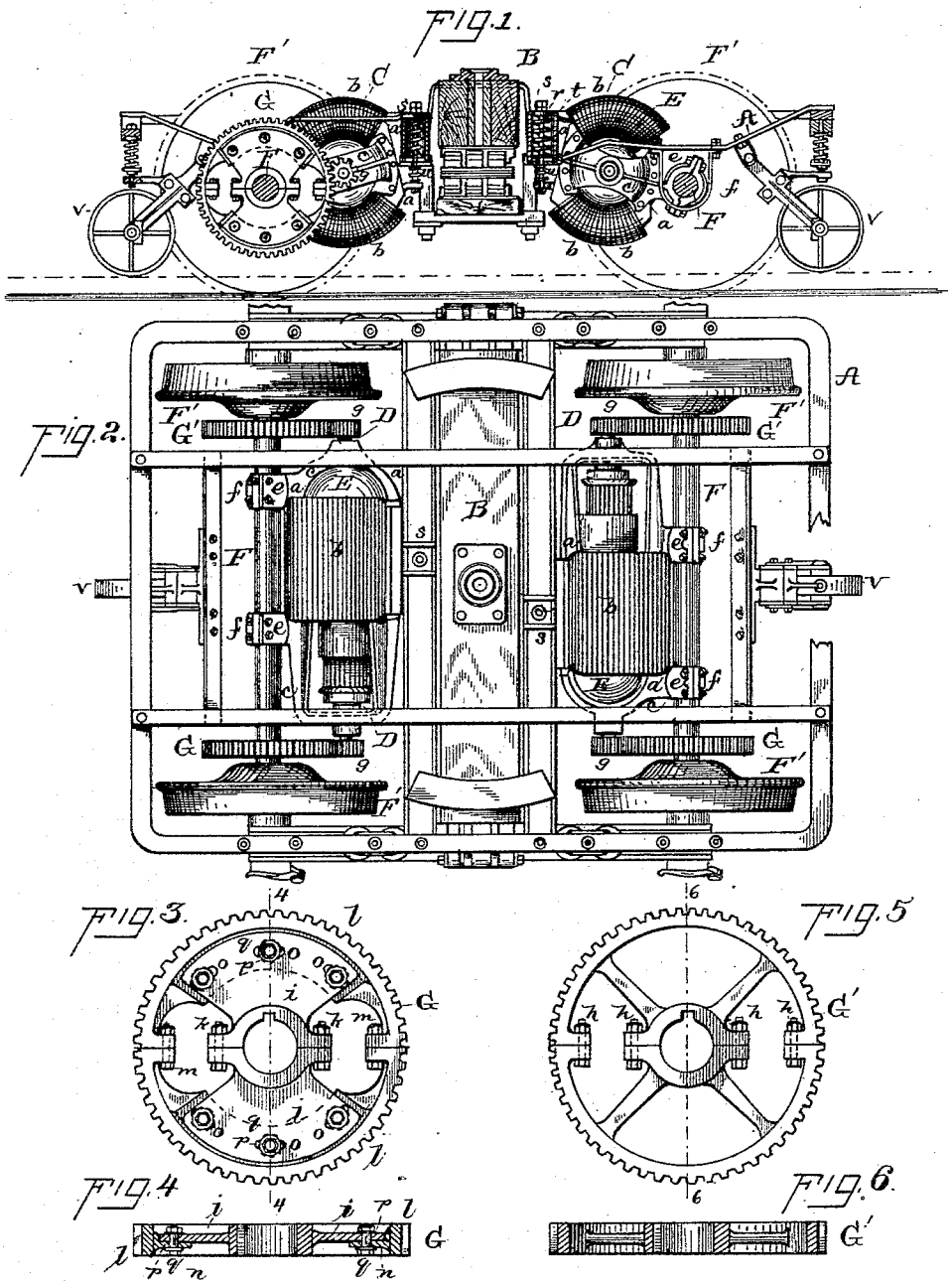

UNITED STATES PATENT OFFICE.

FRANK J. SPRAGUE, OF NEW YORK, N. Y.

GEARING.

SPECIFICATION forming part of Letters Patent No. 387,745, dated August 14, 1888.

Application filed April 18, 1887. Serial No. 235,148. (No model.)

*To all whom it may concern:*

Be it known that I, FRANK J. SPRAGUE, of the city of New York, in the county and State of New York, have invented a certain new and useful Improvement in Gearing, of which the following is a specification.

My invention relates mainly to a novel construction for a toothed gear-wheel, the same having been designed by me with especial reference to the propulsion of railway-cars or other vehicles by electric motors mounted thereon; and, further, my invention relates to the novel combination of such peculiar gear-wheel with other operating parts of the car or other apparatus.

The main object of the present invention is to more effectively enable the driving-axle to be driven from both ends of the armature-shaft, whereby a more certain and effective transmission of the power is secured; and, further, my object is generally to increase the simplicity, convenience, strength, and efficiency of apparatus of the character described and to diminish the noise which usually occurs with toothed gears.

My invention consists in the novel devices and combinations of devices employed by me in accomplishing the above-named objects, as hereinafter set forth and claimed While, as I have stated, the gear-wheel, which mainly constitutes my invention, was mainly intended for use in electric-railway cars, it is evidently adapted to be also used in other situations.

My invention is illustrated in the accompanying drawings, in which—

Figure 1 is a longitudinal section of a truck arranged according to my invention, the different parts of the truck being on different sectional lines, which will be readily understood from the description hereinafter contained; Fig. 2, a top view of the same; Fig. 3, an elevation of the gear-wheel used at one end of the driving-axle; Fig. 4, a section on line 4 4 of Fig. 3; Fig. 5, an elevation of the gear-wheel at the other end of the axle; Fig. 6, a section on line 6 6 of Fig. 5, and Fig. 7 a view illustrating the arrangement of two pinions on the armature-shaft.

A represents the frame of a railway-car truck, and B is the cross-bolster thereof. I prefer, as shown, to place two motors upon a truck, each geared to an axle at one end of said truck. The construction, arrangement, and mechanical connections of the two motors are precisely the same. Each motor C has a field-magnet with pole-pieces $a$ $a$ and coils $b$ $b$. From said pole-pieces extend hangers $c$ $c$, of non-magnetic metal, which form bearings for the support of the armature-shaft D, carrying the armature E. From the hangers $c$ $c$, at each end of the armature, a part, $e$, extends, which surrounds one side of the driving-axle F, having upon it the wheels F', and has bolted to it a cap, $f$, surrounding the other side of the axle. The field-magnets of the two motors are thus sleeved or centered upon the two driving-axles of the truck, respectively. Upon each end of each armature-shaft is keyed a toothed wheel or pinion, $g$. These pinions engage with the toothed gear-wheels G and G', keyed on each driving-axle. The two gears on each axle are both split gears in the form shown, where such gears are placed inside the wheels, since such gears are placed in position after the wheels are on the axle. The gear-wheel G' is made simply in two parts attached together by bolts $h$ $h$. The gear-wheel G is a wheel having an adjustable rim or periphery and forms a principal feature of my invention. It consists of an internal web consisting of two parts, $i$ $i$, secured together by bolts $k$ $k$, and a toothed rim consisting of two semicircular parts, $l$ $l$, bolted together at $m$ $m$, and each having an internal flange, $n$. Each part $i$ of the web is provided with one or more curved slots or oblong apertures, $o$. Through these slots and through bolt-holes in the flanges $n$ pass the bolts $p$ $p$, each provided with nuts $q$.

It will be seen that by loosening the nuts $q$ the rim $l$ $l$ may be moved around upon web $i$ $i$ to adjust its position thereon. The object of this is to enable the gears at both ends of the driven shaft to mesh smoothly with the pinions on both ends of the driving-shaft. Without this it would be very difficult and practically impossible to so key the four gear-wheels on their respective shafts that they would mesh smoothly and precisely while the motor is running in either direction. With my invention, however, the gears may all be placed on their respective shafts and axles without regard to their meshing, and then while the nuts $q$ are loosened the motor may be run backward and forward two or three times, and as the adjustable rim of the wheel G moves on its stationary web its teeth will immediately assume an absolutely-correct position relative to the pinion which they engage, and the nuts being then tightened and the rim thus clamped to the web both ends of the shafts will engage and run together in precisely the same manner.

I prefer to key the two pinions on the armature-shaft in the manner illustrated in Fig. 7, with one set half a tooth behind the other. This produces a continuous transmission of power, since one gear is at its strongest position when the other is at its weakest; and since the two shafts are always in close connection at one end or the other the noise due to the hammering of the gears is prevented.

In order to provide a flexible support for the motor, the inner end thereof is carried by an adjustable bolt, $r$, which passes through a casing, $s$, attached to the truck-frame, or if, as in a street-car, there is no truck, to the body of the car. Within this casing the bolt is provided with a strong spiral spring, $t$. This permits the motor to move independently of the truck, and since at its other end the motor is sleeved upon the driving-axle it follows the vertical movements of the axle when they occur, and the position of the motor relative to the axle is thus always maintained.

To take up any tendency to back movement or lift of the motor due to the rotation of the armature, I provide a small spring, $u$, surrounding the bolt $r$ below the casing $s$.

The wheels $v\,v$ are contact-wheels for taking current from a middle rail when that form of conductor is used.

What I claim is—

1. A split toothed wheel having an adjustable rim or periphery, substantially as set forth.

2. A gear-wheel having in combination an internal web composed of two parts united together, and a toothed rim or periphery, also made in two parts united together and adjustably secured upon said web, substantially as set forth.

3. The combination of a shaft provided with two pinions situated at different points thereon, and a shaft provided with two toothed wheels engaging said pinions respectively, and one of said wheels being a split wheel provided with an adjustable rim or periphery, substantially as set forth.

4. The combination of a wheeled vehicle, an electric motor thereon, a pinion at or near each end of the armature-shaft of said motor, a split toothed wheel having an adjustable rim or periphery upon the driving-axle of said vehicle at one end thereof and engaging with one of said pinions, and a toothed wheel at the other end of said axle engaging with the other pinion, substantially as set forth.

This specification signed and witnessed this 15th day of April, 1887.

FRANK J. SPRAGUE.

Witnesses:
A. W. KIDDLE,
WM. PELZER.